United States Patent

Castelloe et al.

[11] Patent Number: 6,067,045
[45] Date of Patent: *May 23, 2000

[54] COMMUNICATION NETWORK INITIALIZATION APPARATUS AND METHOD FOR FAST GPS-BASED POSITIONING

[75] Inventors: Michael Castelloe; Allan Lamkin, both of San Diego, Calif.; Anthony Noerpel, Lovettsville, Va.; Dave Roos, Boyds, Md.

[73] Assignee: Hughes Electronics Corporation, El Segundo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/301,268

[22] Filed: Apr. 28, 1999

Related U.S. Application Data

[60] Provisional application No. 60/109,963, Nov. 25, 1998, provisional application No. 60/098,686, Sep. 1, 1998, and provisional application No. 60/098,664, Sep. 1, 1998.

[51] Int. Cl.[7] .............................. G01S 5/02; H04B 7/185
[52] U.S. Cl. .............................. 342/357.09; 342/357.01; 342/357.06; 701/213
[58] Field of Search .................... 342/357.01, 357.06, 342/357.1, 357.09, 359; 701/213

[56] References Cited

U.S. PATENT DOCUMENTS

| | | | |
|---|---|---|---|
| 5,311,194 | 5/1994 | Brown | 342/357 |
| 5,841,396 | 11/1998 | Krasner | 342/357 |
| 5,862,495 | 1/1999 | Small et al. | 701/13 |
| 5,874,914 | 2/1999 | Krasner | 342/357 |
| 5,917,444 | 6/1999 | Loomis et al. | 342/357 |
| 5,945,944 | 8/1999 | Krasner | 342/357.06 |

FOREIGN PATENT DOCUMENTS

| | | |
|---|---|---|
| WO 97/33382 | 9/1997 | WIPO . |
| WO 98/25157 | 6/1998 | WIPO . |

*Primary Examiner*—Thomas H. Tarcza
*Assistant Examiner*—Dao L. Phan
*Attorney, Agent, or Firm*—John T. Whelan; Michael W. Sales

[57] ABSTRACT

An apparatus and method is disclosed, utilizing a communications network (in this particular design, it is a GEM (Geo-Mobile) satellite system) to initialize a Global Positioning System (GPS) receiver (such one integrated into a handheld user terminal, or phone used within the communication network) to enable the GPS receiver to quickly acquire GPS satellite signals and perform positioning calculations. By systematically feeding the GPS receiver key pieces of information (GPS satellite trajectories, time estimate, position estimate, and additional positional references), the time to first fix (TTFF) of the GPS receiver can be drastically reduced.

17 Claims, 9 Drawing Sheets

NOTE: 2-D plane is perpendicular to the axis x'

.... : Spot beam 2 power
-- : Spot beam 3 power
☆ : Terminal location
⊙ : spot beam center ☆ : user location
⊙ : spot beam center
⋯ : confidence region

• : center of selected spot beam

COMMUNICATION NETWORK INITIALIZATION APPARATUS AND METHOD FOR FAST GPS-BASED POSITIONING

Priority of U.S. Provisional Patent Application No. 60/109,963, filed on Nov. 25, 1998, U.S. Provisional Patent Application No. 60/098,664, filed on Sep. 1, 1998, and U.S. Provisional Patent Application No. 60/098,686, filed on Sep. 1, 1998, is hereby claimed under 35 USC § 119 (e).

BACKGROUND OF THE INVENTION (a) Field of the Invention

The present invention relates generally to a method and apparatus for initializing a Global Positioning System (GPS) receiver for use in a communication network, and more particularly, to a method and apparatus for initializing a GPS receiver forming part of a communication network in such a manner that facilitates rapid determination of the position of the GPS receiver upon startup of the GPS receiver.

(b) Description of Related Art

Typically, a GPS receiver relies on GPS satellite trajectory parameters stored in memory during recent operation, a time estimate from a running clock or user input, and a position estimate from memory or user input to perform a startup faster than a "old start". If any of this information is missing, a cold start will be necessary and the time to first fix (TTFF) may be 1–3 minutes.

In general, one common strategy for a GPS receiver integrated into a communication network is to either continually track GPS satellites, or cycle on at timed intervals to obtain a fix, resynchronize a local clock, and download GPS parameters. The disadvantages to this approach are: 1) longer acquisition times in general; 2) larger power consumption and processing drain; and 3) the need for GPS acquisition at times when terminal is not otherwise in use (in the case of a handheld terminal, this is particularly problematic; when the terminal is not in use it may be stowed somewhere, such as a pocket or briefcase, where GPS satellite visibility is very poor).

Another strategy involves a wholly integrated approach, where a terminal reports intermediate GPS measurements to the network, and the network performs the actual positioning computations. The disadvantages of this approach are 1) increased data transfer from the terminal to the network is needed; 2) complex network computing facilities are required to handle each terminal separately; and 3) the terminal is unable to perform GPS positioning when network is not available.

There are technologies emerging in communication networks, primarily for Emergency-911 systems, such as those developed by Navsys, Inc. and Snaptrack, Inc., that use wholly integrated approaches to determination of terminal positions, meaning that the position determination requires substantial handshaking and cooperation between remote terminals and the network infrastructure. (As used herein, the term "terminal" describes a mobile unit within a communication network, such as a cellular phone.)

SUMMARY OF THE INVENTION

The invention is directed to a comprehensive method of utilizing a communications network (in this particular design, it is a GEM (Geo-Mobile) satellite communication network system) to initialize a Global Positioning System (GPS) receiver (such as one contained within a handheld user terminal) to enable the GPS receiver to quickly acquire GPS satellite signals and perform positioning calculations. By systematically feeding the GPS receiver key pieces of information such as, for example, (GPS satellite trajectories, time estimate, position estimate, and additional positional references), the time to first fix (TTFF) of the GPS receiver can be significantly reduced. One novel aspect of the invention is the series of actions taken by the GEM system to determine and provide, to the GPS receiver, information that otherwise may not be available.

The present invention is useful for a Geo-mobile (GEM) satellite phone network, where any and all terminals may be initialized at any time by the generic broadcast of the GEM satellite, but could be applied to a broad class of communication networks. A network may require that a terminal (e.g., a wireless telephone) determine and report its position before each call it places with the network. For this reason, fast GPS-based positioning capability within each terminal is required. This invention provides the capability to automatically and simultaneously initialize all terminals with the information required to obtain minimal GPS acquisition times.

It has been determined that minimal position determination times are achievable if the following five pieces of information are available to a terminal, and hence to its integrated GPS receiver:

1. Satellite parameters describing orbital trajectories for all GPS satellites in view to the terminal, used by the terminal to compute satellite positions at a given instant in time (a critical step in the receiver's computation of its own position);
2. GPS time estimate to within a few milliseconds;
3. A rough position estimate to within a few hundred kilometers;
4. A GPS almanac; and
5. Additional positional references.

As will be appreciated by those skilled in the art, providing orbital trajectories for all GPS satellites visible to the terminal is optimal. However, the invention contemplates utilizing orbital trajectories for fewer than all visible GPS satellites as well.

The system in accordance with the invention continuously determines and provides all five of the above pieces of information to all terminals in the coverage area, so that any terminal, at any time, is able to perform a fast position determination.

The GEM system, for example, is designed to provide these key pieces of information as follows:

1. GPS satellite trajectories: Each ground station supports a continually active GPS receiver that tracks all visible GPS satellites, and stores satellite parameters precisely describing their orbits, for all of them. The ground station predicts which GPS satellites are in view to each distinct service area (spot beam), and the GEM satellite broadcasts local trajectory coefficients (computed at the ground station) for those GPS satellites through each spot beam.

2. GPS time: The ground station is synchronized to GPS time, via the ground station's active GPS receiver. GPS time, adjusted for propagation delay to within a few milliseconds, is broadcast with the satellite information.

3. Rough position estimate: The terminal measures relative signal strengths of broadcast channels in neighboring spot beams. Based on these measurements, a position estimate typically accurate to about 100 km can be computed, although a position estimate accuracy up to about 1,000 km may be acceptable.

4. A GPS almanac is downloaded at the ground station and re-broadcast to the coverage area.

5. With further network initialization, GPS acquisition may be possible in poor GPS satellite visibility situations. An extremely accurate time reference (e.g., accurate to within two microseconds) could reduce the number of required GPS satellite signal acquisitions from four to three, provided some degradation in fix accuracy is acceptable. If the communication network can provide precise pieces of position information (such as altitude, and/or distance from a known reference), the number of GPS satellites needed may be further reduced.

In accordance with one aspect of the present invention, a method is provided for initializing a GPS receiver to rapidly acquire GPS satellite signals for establishing a precise estimate of the position of the GPS receiver. The method comprises the steps of: broadcasting a signal representative of orbital trajectories of one or more GPS satellites within view of the GPS receiver; broadcasting a time synchronization signal; calculating a rough estimate of the position of the GPS receiver may be calculated; and inserting the signal representative of orbital trajectories, the time synchronization signal, and the rough estimate of the position of the GPS receiver into the GPS receiver.

Preferably, the time synchronization signal is accurate to within about five milliseconds and the rough estimate of the position of the GPS receiver is accurate to within about 1,000 kilometers.

Preferably, the orbital trajectories signal is broadcast via a satellite, using an idle communication channel. Also preferably, the time synchronization signal is broadcast via a satellite, using an idle communication channel.

Obviously, it is desirable to have a time synchronization signal that is extremely accurate (e.g., to within a few microseconds). However, such accuracy levels are generally not feasible.

In accordance with another aspect of the present invention, a communication network comprises at least one communication station, a plurality of GPS satellites, and a terminal. The communication station includes capability for sending communication signals, GPS satellite trajectory signals, and time synchronization signals to the terminal. The terminal includes apparatus for receiving communication signals from the communication station, apparatus for sending communication signals to the communication station, apparatus for receiving GPS signals from the GPS satellites, and apparatus for processing the GPS satellite trajectory signals and time synchronization signals to rapidly determine the position of the terminal.

In accordance with yet another aspect of the invention, a method of initializing a remote GPS receiver to rapidly acquire GPS satellite signals for establishing a precise estimate of the position of the remote GPS receiver is provided. The method comprises the steps of: providing an active GPS receiver at a fixed location which computes precise GPS satellite trajectories; broadcasting a signal representative of the precise GPS satellite trajectories of one or more GPS satellites within view of the remote GPS receiver; broadcasting a time synchronization signal; calculating a rough estimate of the position of the remote GPS receiver; and inserting the signal representative of orbital trajectories, the time synchronization signal, and the rough estimate of the position of the remote GPS receiver into the remote GPS receiver.

In accordance with still another aspect of the invention, a terminal for use in a communication network is provided. The communication network comprises at least one communication station and a plurality of GPS satellites. The communication station includes apparatus for sending communication signals, GPS satellite trajectory signals, and time synchronization signals to the terminal. The terminal comprises an apparatus for receiving communication signals from the communication station, an apparatus for sending communication signals to the communication station, an apparatus for receiving GPS signals from the GPS satellites, and an apparatus for processing the GPS satellite trajectory signals and time synchronization signals to rapidly determine the position of the terminal.

In accordance with yet another aspect of the invention, a gateway station for use in a communication network is provided. The communication network comprises at least one terminal, a communications satellite and a plurality of GPS satellites. The gateway station comprises a continually-tracking GPS receiver, apparatus for computing GPS satellite trajectory data for GPS satellites visible to each terminal, apparatus for computing a rough position estimate for each terminal, and apparatus for sending signals representing GPS satellite trajectory data, time synchronization signals, and signals representing rough position estimates to each terminal.

The invention disclosed herein has the distinct advantage that the terminals possess self-contained fully functional GPS receivers. The invention acts as a supplement to greatly accelerate GPS receiver operation, not replace it. Thus, each terminal has full GPS functionality even when the communication network is not available. In addition, the handshaking required to compute a terminal position is reduced to a 1-way generic broadcast from the communication network to the terminals. All terminals in a given geographic cluster of up to a few hundred km receive the same information and proceed with the accelerated GPS acquisitions. No information is required to be transmitted from the terminal to the network. The position, when computed, is available for immediate display to the user of the terminal, and may be transmitted to the network if desired.

By using the invention, the GEM system will automatically provide the GPS receiver with enough information to optimize startup, regardless of what is in memory, without a running clock, and with no user intervention. The result is a more consistent, and much faster initial position fix, that typically takes only a few seconds.

The invention provides enhanced customer satisfaction and power savings in the terminal, which is especially important where the terminal is a portable handset having a finite battery charge. It is, further, particularly effective whenever a user tries to place a phone call in a network that requires a GPS position fix before a call is allowed. GPS positioning functionality consistently delaying call setup for 1–3 minutes would have a devastating effect on product quality. With use of the present invention, the GPS process should delay registration or call setup no more than a few seconds. The second benefit of the invention is that once a GPS position is obtained, the GPS receiver may be turned off. A GPS receiver may consume up to about 0.5 W while on, and use of the invention would greatly reduce the amount of on-time, and therefore power consumption.

The invention itself, together with further objects and attendant advantages, will be best understood by reference to the following detailed description, taken in conjunction with the accompanying drawing.

DESCRIPTION OF THE PREFERRED EMBODIMENT

The invention will now be described in connection with a current application of the inventive method to a GEM satellite communication network system. However, the invention is applicable to any wireless communication network.

For each aspect of this invention described below, the general method that could apply to a wide class of communication networks will be described, as well as the specific method designed for use in the GEM system.

Figure 1:
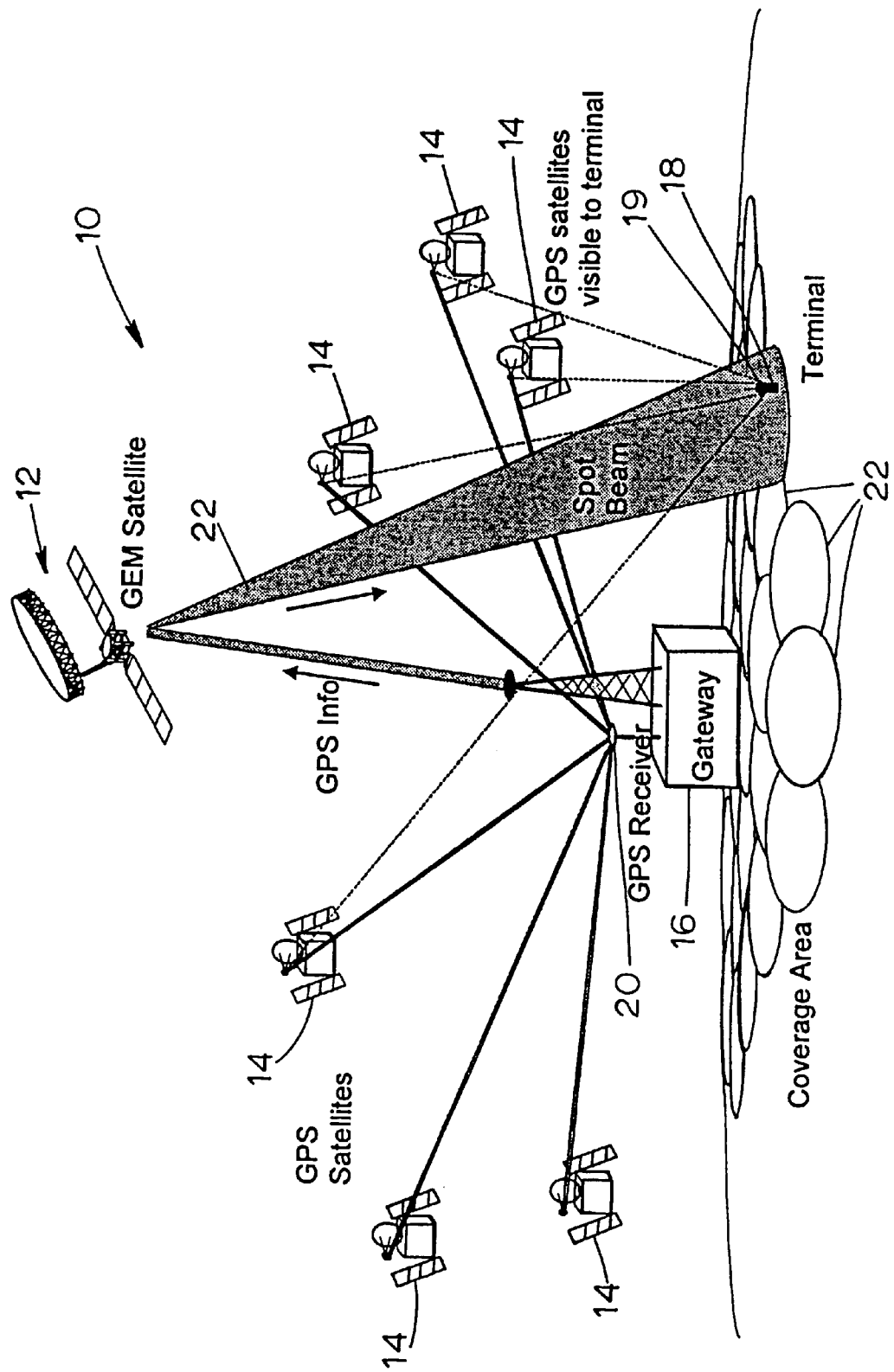
FIG. 1 is a schematic representation of a satellite communication network in accordance with the present invention.

As shown in FIG. 1, a satellite network 10 in accordance with the present invention includes a Geo-Mobile (GEM) satellite 12, a plurality of GPS satellites 14, a gateway 16, and a plurality of terminals 18. Each terminal 18 includes a GPS receiver 19.

Figure 4:
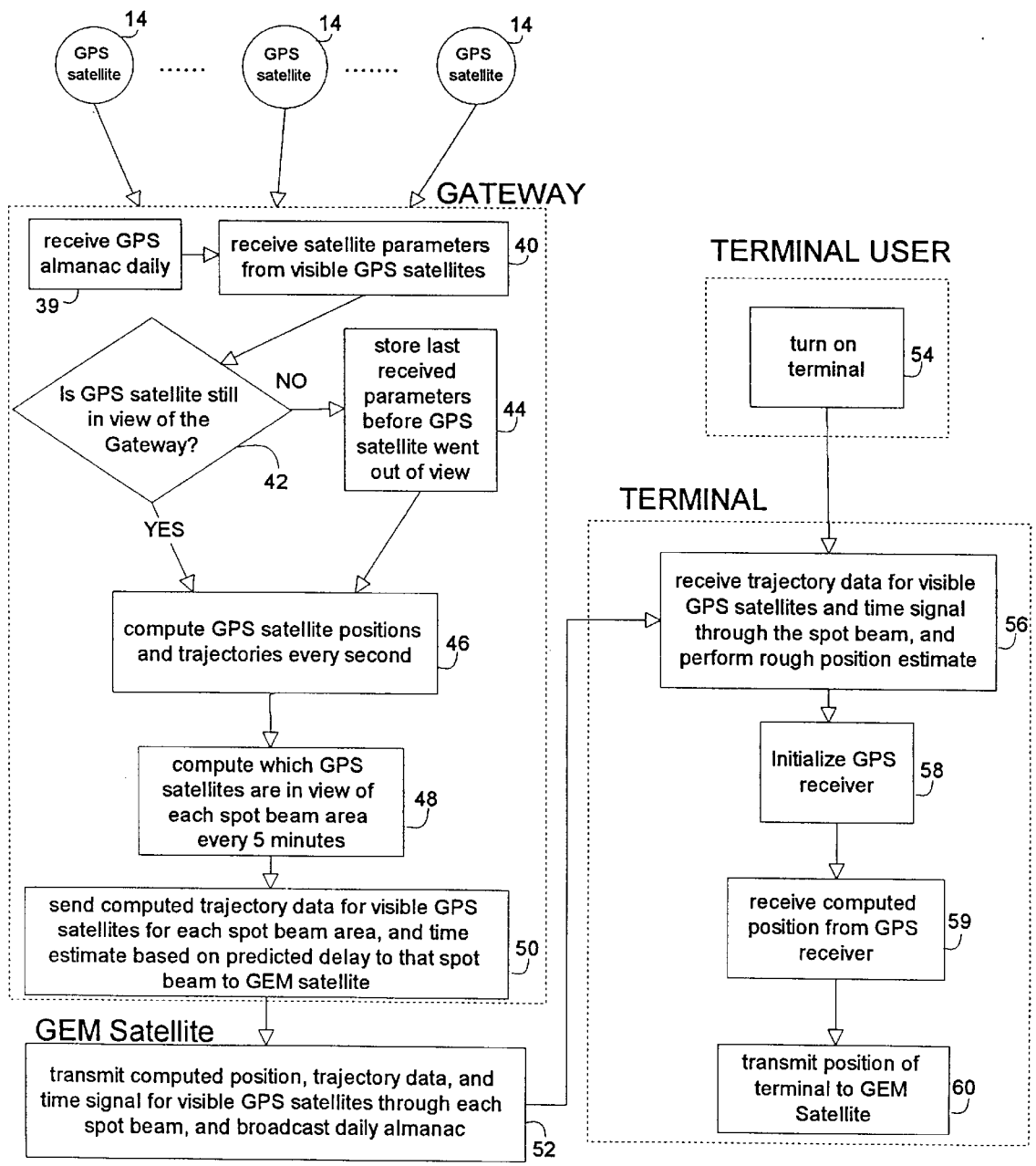
FIG. 4 is a flow diagram illustrating a method, in accordance with the present invention, of initializing a GPS receiver for a rapid position determination.

Upon powering up (block 54 of FIG. 4), each terminal 18 immediately receives position data for visible GPS satellites 14, a time signal, and performs a rough position estimate of the GPS receiver 19, as shown at block 56 of FIG. 4. The rough position estimate could be, for example, based simply on knowledge of which spot beam 22 the GPS receiver 19 is located within. (In a terrestrial cellular application, the cells are typically only a few miles across and accordingly, the rough position estimate could be based on knowledge of which cell contains the GPS receiver 19.)

The GPS receiver 19 in the terminal 18 is initialized and allowed to perform a precise position computation (block 58 of FIG. 4). The terminal 18 receives the computed position (block 59 of FIG. 4) and transmits the computed position to the GEM satellite 12 (block 60 of FIG. 4).

Providing GPS Satellite Trajectories:

General Case

The network 10 maintains at least one continually-tracking GPS receiver 20, located at the gateway 16, that downloads and stores GPS satellite parameters, such as ephemeris, ionosphere correction, clock correction, etc., as defined in Navstar's ICD-GPS-200, from each GPS satellite 14 that is in view, as indicated at block 40 in FIG. 4. GPS satellite orbits are about 12 hours. While a GPS satellite 14 is out of view, last available parameters are stored and used for their validity duration, as indicated at blocks 42 and 44 of FIG. 4. Or, extrapolation may be used, or multiple continually-tracking GPS receivers 20 may be spread over the entire coverage area and may be networked to accommodate brief periods between the expiration of a GPS satellite's stored data validity period and the return to view of that GPS satellite.

Each gateway 16 maintains valid parameters for as many as possible GPS satellites 14 visible to area of responsibility of the gateway 16 at all times. When a terminal 18 needs to make a position fix, it receives a signal broadcast by the network 10 that communicates which GPS satellites 14 should be in view to the terminal 18, based on a rough position estimate, and sends the terminal 18 valid parameters (either the parameters stored, or localized trajectory coefficients derived from the stored parameters) for those GPS satellites 14. In this manner, the terminal 18 receives the necessary GPS information much more quickly than it could receive and process the same information directly from the GPS satellites 14, as happens in normal GPS receiver operation.

GEM System

Figure 2:
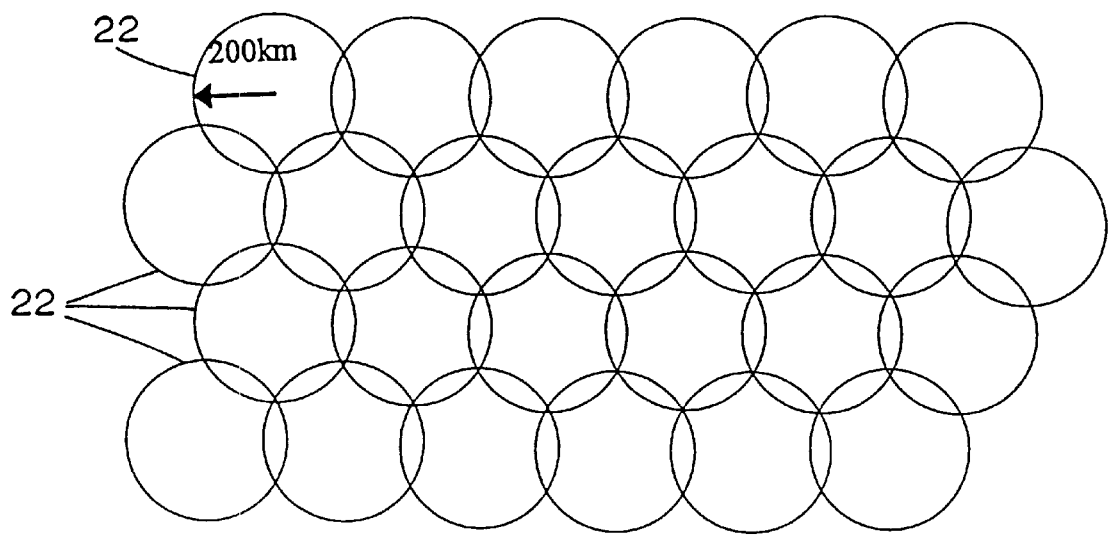
FIG. 2 is a schematic representation of an illumination pattern of overlapping spot beams projected on the Earth by a communication satellite in accordance with the present invention.

The GEM satellite 12 illuminates the coverage area on the surface of the Earth 21 with overlapping spot beams 22, about 200 km in radius, as shown in FIG. 2. Satellite trajectory coefficients, computed from the GPS satellite parameters downloaded and stored at each gateway 16, which enable a terminal GPS receiver to accurately compute GPS satellite position at any instant in the next few minutes, must be sent separately through each spot beam 22, for the GPS satellites 14 in view to receivers 18 within that spot beam.

As shown in FIG. 1, the continually-tracking GPS receiver 20 is maintained at a each ground station (e.g., gateway 16). From all GPS satellites 14 in view to the gateway GPS receiver 20 at a given time, parameters such as ephemeris, ionosphere correction, clock correction, etc. as defined in Navstar's ICD-GPS-200, are downloaded and stored at every opportunity. When a GPS satellite 14 leaves view of the central gateway 16, last available parameters are stored and used, until the GPS satellite data becomes too old or the GPS satellite 14 returns to view (within a few hours).

From these parameters, and as indicated at block 46 of FIG. 4, GPS satellite positions are computed every second, as described in Navstar's ICD-GPS-200 and reproduced in Table 1, Table 2, and Table 3. A predictive third order curve fit of the type shown in the equations below is computed for each satellite trajectory, based on Lagrange interpolation of several computed positions, spread over a 10 minute interval, starting with the current position at time $t_0$, and predicting future positions.

$$\begin{cases} \tilde{x}_k(t) \approx a_0 + a_1(t-t_0) + a_2(t-t_0)^2 + a_3(t-t_0)^3 \\ \tilde{y}_k(t) \approx b_0 + b_1(t-t_0) + b_2(t-t_0)^2 + b_3(t-t_0)^3 \\ \tilde{z}_k(t) \approx c_0 + c_1(t-t_0) + c_2(t-t_0)^2 + c_3(t-t_0)^3 \end{cases} \quad \text{Equation 1}$$

For up to twelve GPS satellites 14 in possible view to any portion of a spot beam 22, the trajectory coefficients $a_{0-3}$, $b_{0-3}$, $c_{0-3}$, and $t_0$ are broadcast repeatedly to that spot beam 22.

To determine which GPS satellites 14 are in view to each spot beam 22, the gateway 16 computes a GPS satellite visibility list for each spot beam 22, based on the spot beam center coordinates $(x_r, y_r, z_r)$, and each GPS satellite 14 position $(x_k, y_k, z_k)$, every five minutes, as indicated at block 48 of FIG. 4. The computed position data for visible GPS satellites 14 for each spot beam 22 is processed to form trajectory data, and is then sent to the GEM satellite 12, as indicated at block 50 of FIG. 4. The GEM satellite 12 continuously transmits, via each spot beam 22, computed trajectory data for visible GPS satellites 14, as indicated in block 52 of FIG. 4.

Figure 3:
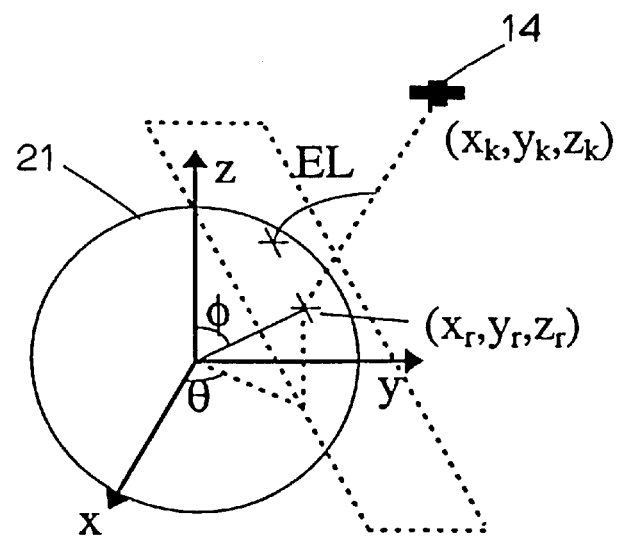
FIG. 3 is a schematic representation of the apparent elevation of a GPS satellite forming part of the satellite communication network of FIG. 1.

Any GPS satellite 14 with an elevation angle from a given center of a spot beam 22 at the surface of the Earth 21 that is within the antenna elevation mask of the terminal 18, is eligible for the visibility list of that spot beam 22. The elevation of a GPS satellite 14 at $(x_k, y_k, z_k)$, from a reference point $(x_r, y_r, z_r)$ on the surface of the Earth 21 (in this case a spot beam center) is illustrated in FIG. 3, and computed as shown in Table 4. The trajectory coefficients $a_{0-3}$, $b_{0-3}$, and $c_{0-3}$ for the GPS satellites 14 determined to be visible within a given spot beam 22 are repeatedly broadcast within the spot beam 22, by the GEM satellite 12, to initialize any terminal 18 within that spot beam 22.

TABLE 1

GPS Satellite Ephemeris Parameters

| | |
|---|---|
| $M_0$ | Mean Anomaly at Reference Time |
| $\Delta n$ | Mean Motion Difference from Computed Value |
| E | Eccentricity |
| $A^{1/2}$ | Square Root of the Semi-Major Axis |
| $\Omega_0$ | Longitude of Ascending Node of Orbit Plane at Weekly Epoch |
| $i_0$ | Inclination Angle at Reference Time |
| $\omega$ | Argument of Perigee |
| $\Omega'$ | Rate of Right Ascension |
| $i'$ | Rate of Inclination Angle |
| $C_{uc}$ | Amplitude of the Cosine Harmonic Correction Term to the Argument of Latitude |
| $C_{us}$ | Amplitude of the Sine Harmonic Correction Term to the Argument of Latitude |
| $C_{rc}$ | Amplitude of the Cosine Harmonic Correction Term to the Orbit Radius |
| $C_{rs}$ | Amplitude of the Sine Harmonic Correction Term to the Orbit Radius |
| $C_{ic}$ | Amplitude of the Cosine Harmonic Correction Term to the Angle of Inclination |
| $C_{is}$ | Amplitude of the Sine Harmonic Correction Term to the Angle of Inclination |
| $t_{oe}$ | Reference Time Ephemeris |
| IODE | Issue of Data (Ephemeris) |

TABLE 2

GPS Satellite Position Computation, Part I

| | |
|---|---|
| $\mu = 3.986 \times 10^{14} \text{ m}^3/\text{sec}^2$ | WGS 84 value of the Earth's universal gravitational parameter |
| $\Omega'_e = 7.292 \text{ rad/sec}$ | WGS 84 value of the Earth's rotation rate |
| $A = \left(\sqrt{A}\right)^2$ | Semi-major axis |
| $n_o = \sqrt{\dfrac{\mu}{A^3}}$ | Computed mean motion-rad/sec |
| $t_k = t - t_{oe}$ | Time from ephemeris reference epoch |
| $n = n_0 + \Delta n$ | Corrected mean motion |
| $M_k = M_0 + nt_k$ | Mean anomaly |
| $M_k = E_k - e \sin E_k$ | Kepler's equation for eccentric anomaly (solved by iteration)-radians |
| $v_k = \tan^{-1}\left\{\dfrac{\sin v_k}{\cos v_k}\right\} = \tan^{-1}\left\{\dfrac{\sqrt{1-e^2} \sin E_k/(1-e\cos E_k)}{(\cos E_k - e)/(1 - e\cos E_k)}\right\}$ | True anomaly |

TABLE 2-continued

GPS Satellite Position Computation, Part I

| | |
|---|---|
| $E_k = \cos^{-1}\left(\dfrac{e + \cos v_k}{1 + e\cos v_k}\right)$ | Eccentric anomaly |
| $\Phi_k = v_k + \omega$ | Argument of latitude |

TABLE 3

GPS Satellite Position Computation, Part II

| | |
|---|---|
| $\delta u_k = C_{us} \sin 2\Phi_k + C_{uc} \cos 2\Phi_k$ | Argument of latitude correction |
| $\delta r_k = C_{rc} \cos 2\Phi_k + C_{rs} \sin 2\Phi_k$ | Radius correction |
| $\delta i_k = C_{ic} \cos 2\Phi_k + C_{is} \sin 2\Phi_k$ | Correction to inclination |
| $u_k = \Phi_k + \delta u_k$ | Corrected argument of latitude |
| $r_k = A(1 - e \cos E_k) + \delta r_k$ | Corrected radius |
| $i_k = i_0 + \delta i_k + i't_k$ | Corrected inclination |
| $x'_k = r_k \cos u_k$ | Position in orbital plane |
| $y'_k = r_k \sin u_k$ | Position in orbital plane |
| $\Omega_k = \Omega_0 + (\Omega' - \Omega'_e)t_k - \Omega'_e t_{oe}$ | Corrected longitude of ascending node |
| $x_k = x'_k \cos\Omega_k - y'_k \cos i_k \sin\Omega_k$ | Earth-fixed coordinate |
| $y_k = x'_k \sin\Omega_k - y'_k \cos i_k \cos\Omega_k$ | Earth-fixed coordinate |
| $z_k = y'_k \sin i_k$ | Earth-fixed coordinate |

TABLE 4

Computation of Satellite Elevation as Observed from Point on Earth's surface

| | |
|---|---|
| $\theta = \tan^{-1}\left(\dfrac{y_r}{x_r}\right)$ | Angles relating reference point on Earth's surface to origin (center of Earth) |
| $\phi = 90° - \tan^{-1}\left(\dfrac{z_r}{\sqrt{x_r^2 + y_r^2}}\right)$ | |
| $\hat{x}_k = x_k - x_r$ <br> $\hat{y}_k = y_k - y_r$ <br> $\hat{z}_k = z_k - z_r$ | Translate origin of coordinate system to reference point on Earth's surface |
| $\tilde{x}_k = \hat{x}_k \sin\theta - \hat{y}_k \cos\theta$ <br> $\tilde{y}_k = \hat{x}_k \cos\theta \cos\phi + \hat{y}_k \sin\theta \cos\phi - \hat{z}_k \sin\phi$ <br> $\tilde{z}_k = \hat{x}_k \cos\theta \sin\phi + \hat{y}_k \sin\theta \sin\phi + \hat{z}_k \cos\phi$ | Rotation of coordinate system so that z-axis points outward from the Earth at reference point on surface |
| $EL = \tan^{-1}\left(\dfrac{\tilde{z}_k}{\sqrt{\tilde{x}_k^2 + \tilde{y}_k^2}}\right)$ | Elevation angle of satellite as seen from reference point on Earth's surface |

Performing the calculations set forth in Tables 2–4 enables the network 10 to choose which GPS satellites 14 to broadcast trajectories for (as well as compute the trajectories themselves) for each spot beam 22. Any terminal 18 within any spot beam 22 may receive all this information for GPS satellites 14 within view of the terminal 18. The information must be broadcast repeatedly and quickly.

The terminal 18 receives this information from the GEM satellite 12, and translates the information to conform to inputs accepted by the GPS receiver.

The GPS receiver 19 computes its precise position based upon the received satellite trajectories and the signals received from a plurality of GPS satellites. These GPS satellite signals must be compensated for timing errors (clock offset, relativity, and group delay) as described in NAVSTAR'S ICD-GPS-200.

For each received GPS satellite signal, a "code phase offset" at time t must be computed:

$$\Delta t_{sv} = a_{f0} + a_{f1}(t-T_{0c}) + a_{f2}(t-T_{0c})^2 + \Delta t_r - T_{gd}$$

where $a_{f0}$, $a_{f1}$, $a_{f2}$, $\Delta t_r$ and $T_{gd}$ are all available from the GPS broadcast as described in NAVSTAR'S ICD-GPS-200, and are referenced to time $T_{0c}$, which is also broadcast.

In accordance with one aspect of the present invention, the satellite trajectory broadcast for each GPS satellite is supplemented with these parameters to enable the GPS receiver 19 to compute its position without downloading these parameters directly from the GPS satellites. Broadcast with each satellite's trajectories are (for the same satellite):

$\Delta t_{sv}$ computed for $t_0$, the same instant for which the trajectories were computed. a 1 with reduced precision, due to the fact that the broadcast signal gives At, a time-varying value.

Then the GPS receiver 19 may correct its received $\Delta t_{sv}$ for the time elapsed since the original computation of $\Delta t_{sv}$ at time $t_0$ $a_{f2}$ also causes time variance, but its effects are neglected and it is not broadcast.

Then the GPS receiver computes a corrected code phase offset $\Delta t_{sv}$ (true) = $\Delta t_{sv}$ (received) + $a_{f1}$ (t–$t_0$)

Where t = current time $t_0$ = time at which $\Delta t_{sv}$ (received) was computed (same time for which trajectory was computed)

Thus, for each satellite in the visibility list, the trajectory information broadcast is shown in Table 5.

TABLE 5

| Field | Description | Bits |
|---|---|---|
| $T_0$ | Time at which trajectory and code phase offset were computed. In GPS time of week, in units of $2^{-20}$ sec | 40 |
| Curve fit cutover | 0 if $t_0$ has not changed since last broadcast; 1 if $t_0$ has changed since last broadcast | 1 |
| ID | Satellite ID (1 to 32) | 6 |
| $\Delta t_{sv}$ | Code phase offset at time $t_0$, in units of $2^{-28}$ sec | 22 |
| $a_{f1}$ | Clock correction received from satellite broadcast. Rounded to 11 bits. Units of $2^{-28}$ sec/sec | 11 |
| $a_0$ | Trajectory parameter from Eq. [1], in units of $2^2$ meters | 24 |

TABLE 5-continued

| Field | Description | Bits |
|---|---|---|
| $b_0$ | Trajectory parameter from Eq. [1], in units of $2^2$ meters | 24 |
| $c_0$ | Trajectory parameter from Eq. [1], in units of $2^2$ meters | 24 |
| $a_1$ | Trajectory parameter from Eq. [1], in units of $2^{-5}$ m/sec | 18 |
| $b_1$ | Trajectory parameter from Eq. [1], in units of $2^{-5}$ m/sec | 18 |
| $c_1$ | Trajectory parameter from Eq. [1], in units of $2^{-5}$ m/sec | 18 |
| $a_2$ | Trajectory parameter from Eq. [1], in units of $2^{-12}$ m/sec$^2$ | 13 |
| $b_2$ | Trajectory parameter from Eq. [1], in units of $2^{-12}$ m/sec$^2$ | 13 |
| $c_2$ | Trajectory parameter from Eq. [1], in units of $2^{-12}$ m/sec$^2$ | 13 |
| $a_3$ | Trajectory parameter from Eq. [1], in units of $2^{-19}$ m/sec$^3$ | 8 |
| $b_3$ | Trajectory parameter from Eq. [1], in units of $2^{-19}$ m/sec$^3$ | 8 |
| $c_3$ | Trajectory parameter from Eq. [1], in units of $2^{-19}$ m/sec$^3$ | 8 |
| TOTAL | | 269 |

Providing Time:
  General Case

The continually-tracking GPS receiver 20 is synchronized to GPS time. The network 10 synchronizes each terminal 18 to GPS time, and the terminal's GPS receiver 19 can be initialized with accurate GPS time. The accuracy of the GPS receiver's time estimate may be controlled by controlling the timing uncertainty of the synchronization between the terminal 18 and the network 10.
  GEM System GPS time is available from the GPS receivers 20 of the gateways 16. Each gateway 16 repeatedly broadcasts GPS time of week, referenced to the broadcast frame structure itself, via the GEM satellite 12, to each spot beam 22. For each spot beam 22, the arrival time of the referenced frame edge at the surface of the Earth 21 is estimated based upon the propagation delay through the GEM satellite 12 and the travel time from the satellite to the surface of the Earth 21. The delay varies across the beam, and the broadcast is designed so the maximum error is minimized (i.e., the average of the maximal and minimal delays is assumed). The time message broadcast to each spot beam 22 is shown in Table 6. The terminal 18 converts the time values into GPS time (the alternate format is broadcast for bandwidth savings), and relays it to the terminal GPS receiver 19.

TABLE 6

GPS Time Synchronization Message

| Field | Description | Bits |
|---|---|---|
| Time Stamp | Minimax time, in GPS time of week, in units of $2^{-20}$ sec. | 40 |
| Frame Number | The number of the GEM frame to which time stamp is referenced | 19 |
| Total | | 59 |

Providing Position Estimate:
  General Case

The network 10 has some indication of the location of a terminal 18. For example, in a cellular network, it is known which cell the terminal 18 is in. For a better estimate, the terminal 18 may store its last known GPS location, and the time of that location fix. The terminal 18 makes an intelligent guess at its location based on: the network's estimate, the predicted accuracy of the network's estimate, the last known position, the time elapsed since that position fix, the predicted likelihood of movement since its last position fix, and the statistical expectation of location of the terminal 18.
  GEM System The terminal 18 estimates its position using the relative power measurements of signals in the three or four strongest available spot beams 22. The user terminal first gets the locations of the GEM satellite 12 and the centers of each of a group of seven to ten nearest spot beams 22 from the broadcast system information carried in the received GEM signals. With this information and the measured signals' relative strengths from the three or four strongest spot beams, the terminal 18 can then calculate its approximate location. The exact distance from the terminal 18 to the GEM satellite 12 can be determined at the gateway by monitoring the 2-way signal propagation time. This distance can then be used to increase the user terminal position accuracy.

Either of the two methods of position determination estimation set forth in detail below can be used for performing position determination estimation promptly based on the signal relative power measurements of the three or four strongest spot beams 22.

POSITION DETERMINATION METHODS BASED ON RELATIVE POWER MEASUREMENTS

Figure 5:
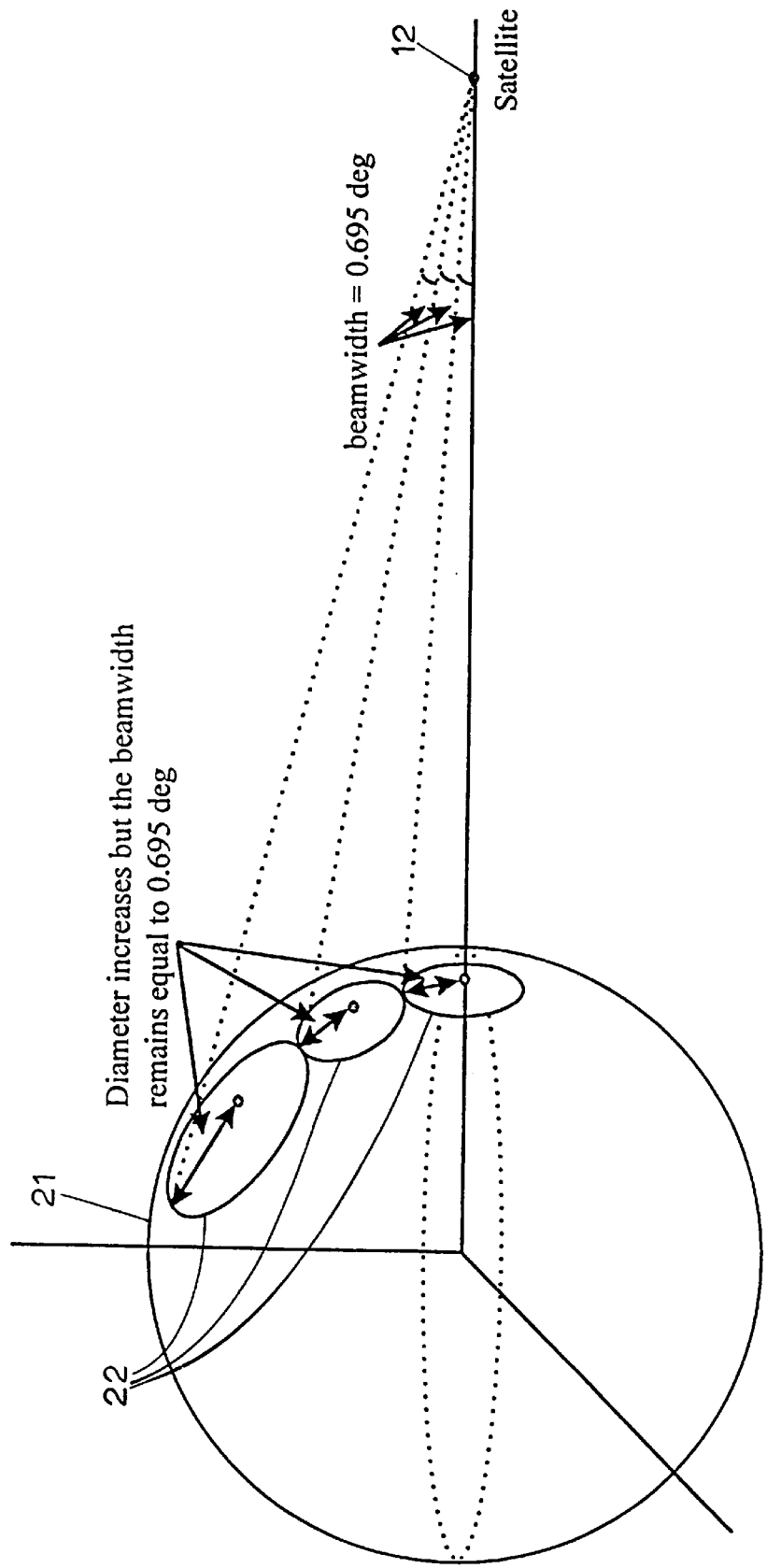
FIG. 5 is a schematic depiction of a satellite and spot beams emanating from the satellite, showing the increasing diameter of the projection of each spot beam on the Earth, as a function of latitude.

Each spot beam 22 in a GEM system has the shape of a cone emitted from the GEM satellite 12. The projection of this cone on the surface of the Earth 21 forms the area served by the spot beam 22. From the satellite perspective, all spot beams 22 are about 0.695° in diameter, i.e., about 0.695° apart if the GEM satellite 12 was in a zero-inclination orbit. Because the GEM satellite 12 moves from about 6° and −6° latitude through the day due to inclined orbit operation, the beamwidth from the satellite perspective will vary to maintain a constant beam "footprint" on the ground. Because of the curvature of the Earth 21, spot beams on the ground have diameters that increase as a function of distance from the subsatellite point. Spot beam diameters can vary between 450 km to more than 1200 km at the far edge of the coverage on the Earth 21. This is shown in FIG. 5.

The spot beams 22 on the Earth 21, projected on a plane perpendicular to the satellite radius are all approximately equivalent, independent of inclined orbit operation, as shown in FIG. 2.

In the GEM system, the GEM satellite 21 is in a nominal geostationary orbit and consequently appears almost stationary relative to the Earth 21 as compared to a low earth-orbit system. In fact, in the GEM system, the GEM satellite 12 moves between about −6 and 6° latitude through the day due to inclined orbit operation. The GEM satellite 12 is located at approximately 35787 km from the surface of the earth 21. At that altitude, it is permissible to assume a spherical earth with a radius of 6378 km and ignore the altitude of the terminal 18 on the Earth 21. Two possible methods are proposed for user terminal position determination.

POSITION ESTIMATE METHOD #1

This position estimate algorithm uses the relative BCCH (Broadcast Control Channel) power measurements of three spot beams 22 at a time. It calculates approximate locations for one to twelve combinations of three spot beams 22 depending on the number of neighbors in the cluster. It then averages these approximate locations to get the final averaged approximate location. It is the preferred method because the algorithm estimates the terminal position much more rapidly.

Figure 6:
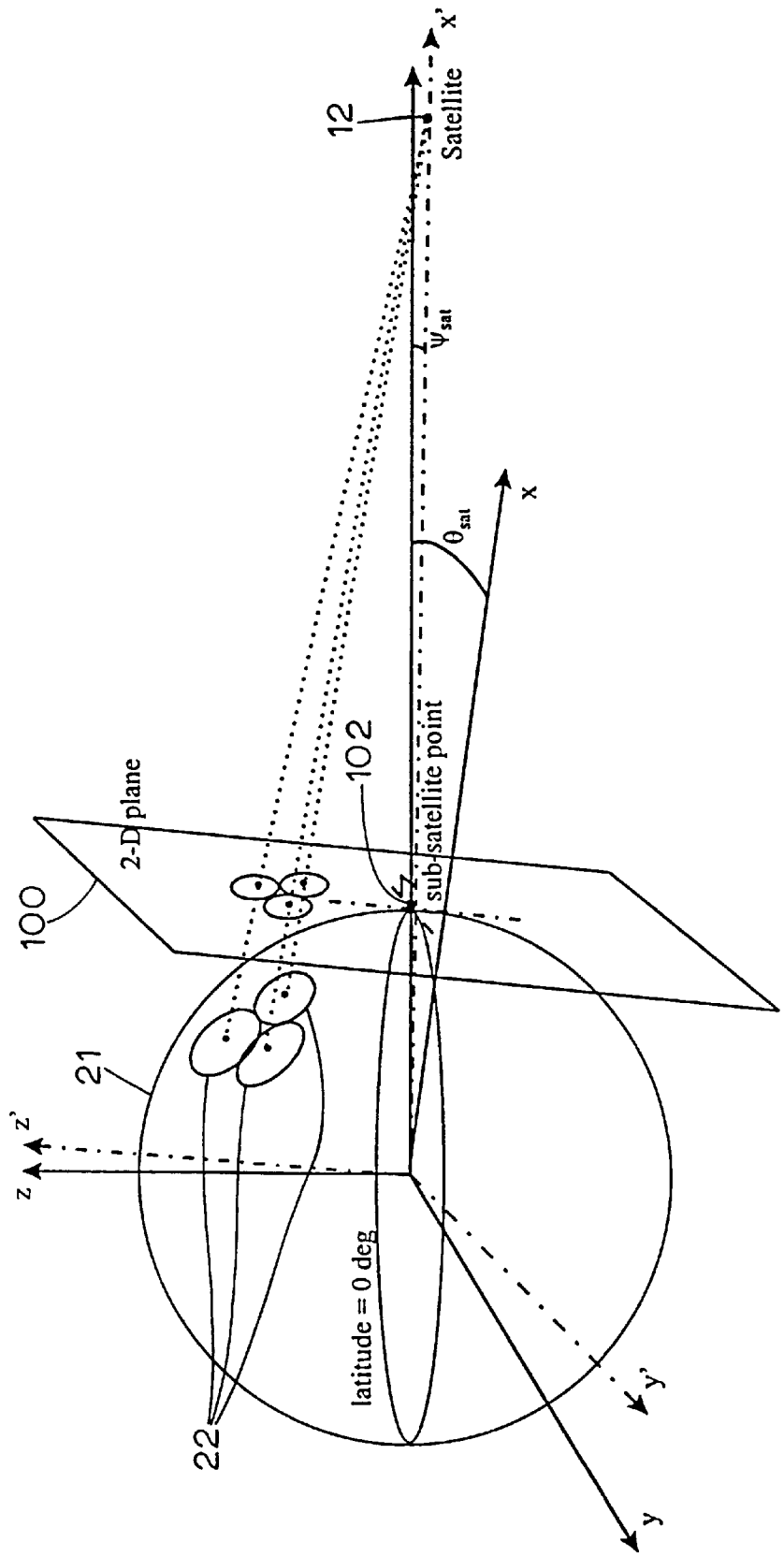
FIG. 6 is a schematic depiction of a satellite and spot beams emanating from the satellite, showing a 2-D plane upon which the spot beams are mapped for a coordinate transformation procedure for use in a first method of determining a user terminal position estimate based on relative power measurements.

To ease the position acquisition problem, two transformations are first performed to map the three spot beams 22 on earth 21 on a 2-D plane 100 perpendicular to the satellite radius (x' axis) and centered around a subsatellite point 102 as shown in FIG. 6. On this new 2-D plane 100, the three spot beams 22 have approximately equivalent dimensions. The first transformation rotates the axis (x,y,z) by $\theta_{sat}$ and $\psi_{sat}$ such that the new axis (x',y',z') are aligned with the satellite radius that passes through the subsatellite point 102. If the GEM satellite 12 has a zero-inclination orbit, $\theta_{sat}$ is the angle between the x axis and the satellite radius x' passing through the subsatellite point 102, and $\psi_{sat}$ is equal to 0. From then on, only the coordinates of the spot beams 22 of interest are moved around while the axis remains fixed at (x',y',z'). The second transformation projects the three spot beams 22 on earth 21 to the 2-D plane 100 centered around the subsatellite point 102.

To further simplify the problem, two additional transformations are performed. The cluster of three spot beams 22 is first translated on the 2-D plane 100 such that the selected spot beam is located at the center of the plane. The plane is then translated such that the center of the 2-D plane 100 corresponding to the subsatellite point 102 matches the center of the earth 21. With these four transformations, the number of unknowns is reduced by one: y and z being the unknowns and x being now equal to 0 for all three spot beams 22. The following algorithm describes the four steps required to map the three spot beams 22 on this 2-D plane. As a general rule for the equations and figures through the rest of this section, (x,y,z), (x',y',z'), etc., without subscripts are axis while $(x_i,y_i,z_i)$, $(x_i',y_i',z_i')$, etc., are spot beam coordinates.

1) Rotate the axis (x,y,z) by $\theta_{sat}$ and $\psi_{sat}$ such that the satellite radius (x' axis) is aligned with the x axis in FIG. 6. The coordinates of the three spot beam$_i$ (i-=1, 2, 3) centers and the GEM satellite 12 become:

$x_i' = (x_i \cos(\theta_{sat}) + y_i \sin(\theta_{sat})) \cos(\psi_{sat}) + z_i \sin(\psi_{sat})$;

$y_i' = y_i \cos(\theta_{sat}) - x_i \sin(\theta_{sat})$;

$z_i' = z_i \cos(\psi_{sat}) - (x_i \cos(\theta_{sat}) + y_i \sin(\theta_{sat})) \sin(\psi_{sat})$ $x_{sat}' = (x_{sat} \cos(\theta_{sat}) + y_{sat} \sin(\theta_{sat})) \cos(\psi_{sat}) + z_{sat} \sin(\psi_{sat})$;

$y_{sat}' = y_{sat} \cos(\theta_{sat}) - x_{sat} \sin(\theta_{sat})$;

$z_{sat}' = z_{sat} \cos(\psi_{sat}) - (x_{sat} \cos(\theta_{sat}) + y_{sat} \sin(\theta_{sat})) \sin(\psi_{sat})$.

Where $\theta_{sat} = a\tan(y_{sat}/x_{sat})$ and $$\psi_{sat} = a\tan\left(z_{sat} / \sqrt{x_{sat}^2 + y_{sat}^2}\right).$$

a $\tan(z_{sat}/\sqrt{x_{sat}^2+y_{sat}^2})$,

2) Find the location of the center of spot beam$_i$ (i=1,2,3) on the 2-D plane (the satellite does not move during this transformation).

3) Translate the x coordinate of spot beam$_i$ (i=1,2,3) center and the GEM satellite 12 by 6378 km such that the 2-D plane 100 is now centered at the center of the earth 21 to eliminate the x component:

a) Find the angle between the GEM satellite 12 and the center of spot beam$_i$ (i=1,2,3):

$$\lambda_{sat_i} = a\sin\left(\frac{z_i'}{d_1}\right);$$

$$\phi_{sat_i} = a\cos\left(\frac{d_2^2 + (R+H)^2 - (x_i'^2 + y_i'^2)}{2 d_2 (R+H)}\right);$$

With $d_1 = \sqrt{(x_{sat}' - x_i')^2 + (y_{sat}' - y_i')^2 + (z_{sat}' - z_i')^2}$;

$d_2 = \sqrt{(x_{sat}' - x_i')^2 + (y_{sat}' - y_i')^2 + (z_{sat}')^2}$.

Figure 7:
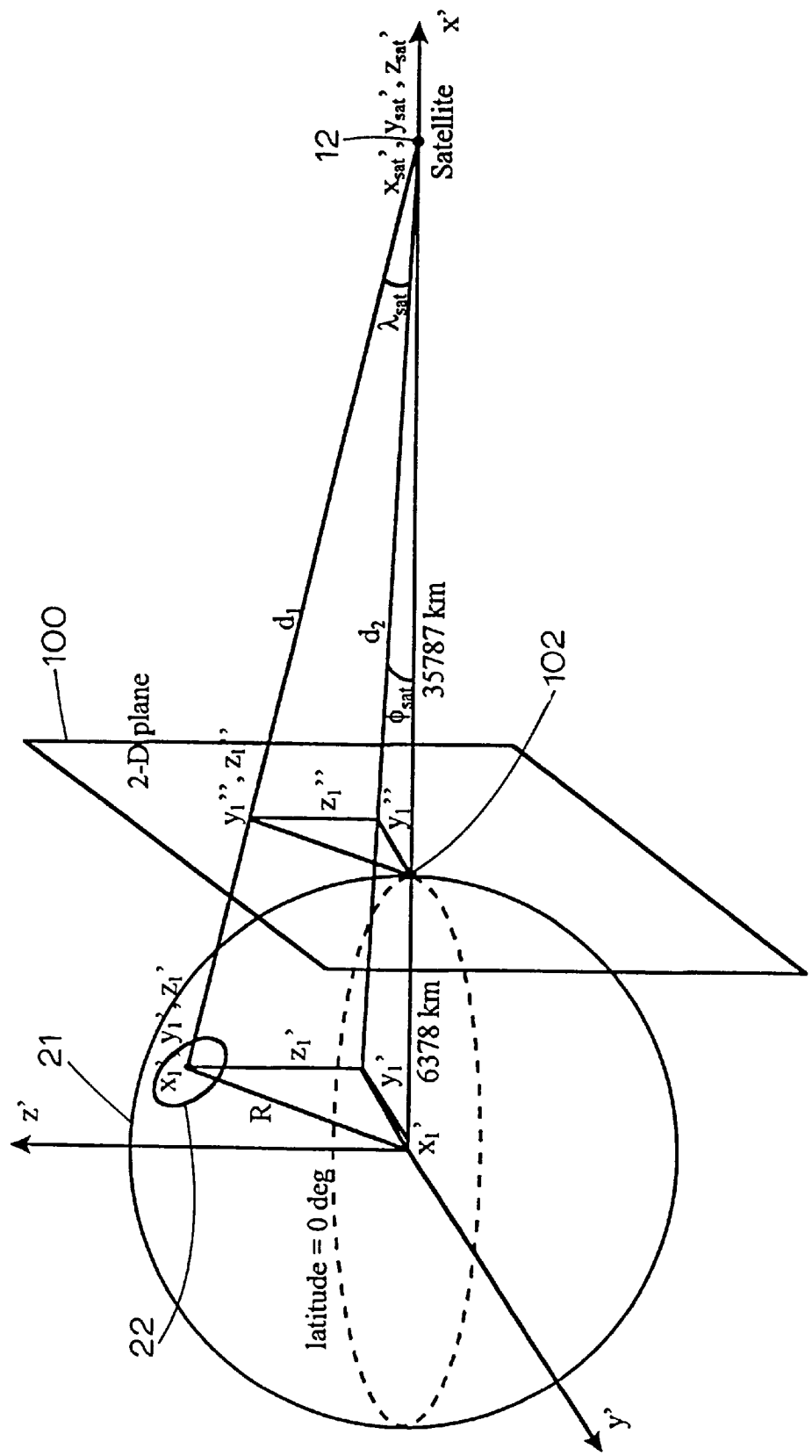
FIG. 7 is a schematic depiction of a satellite and a spot beam emanating from the satellite, showing distances and angles for use in the first method of determining the user terminal position estimate based on relative power measurements.

Check if $x_i$ or $y_i$ is negative. If yes, $\phi_{sat_i} = -\phi_{sat_i}$;

b) Find the location of the center of spot beam$_i$ (i=1,2,3) on the 2-D plane 100. Then, translate the x coordinate of spot beam$_i$ (i=1,2,3) center and the GEM satellite 12 by 6378 km $x_i'' = 0$;

$y_i'' = H \tan(\phi_{sat_i})$;

$z_i'' = \sqrt{H^2 + y_i''^2} \tan(\lambda_{sat_i})$;

$x_{sat}'' = x_{sat}' - R$;

$y_{sat}'' = y_{sat}'$;

$z_{sat}'' = z_{sat}'$.

where R=6378 km; H=35787 km; $\phi_{sati}$, $\lambda_{sati}$, $d_1$ and $d_2$ are depicted in FIG. 7.

4) Translate the coordinates of spot beam$_i$ (i=1,2,3) center and the GEM satellite 12 such that the center of the 2-D plane 100 concords with the center of the selected spot beam $(y_1, z_1)$ $y_i''' = y_i'' - y_i''$;

$z_i''' = z_i'' - z_1''$;

$x_{sat}''' = x_{sat}''$;

$y_{sat}''' = y_{sat}'' - y_1''$;

$z_{sat}''' = z_{sat}'' - z_1''$.

Figure 8:
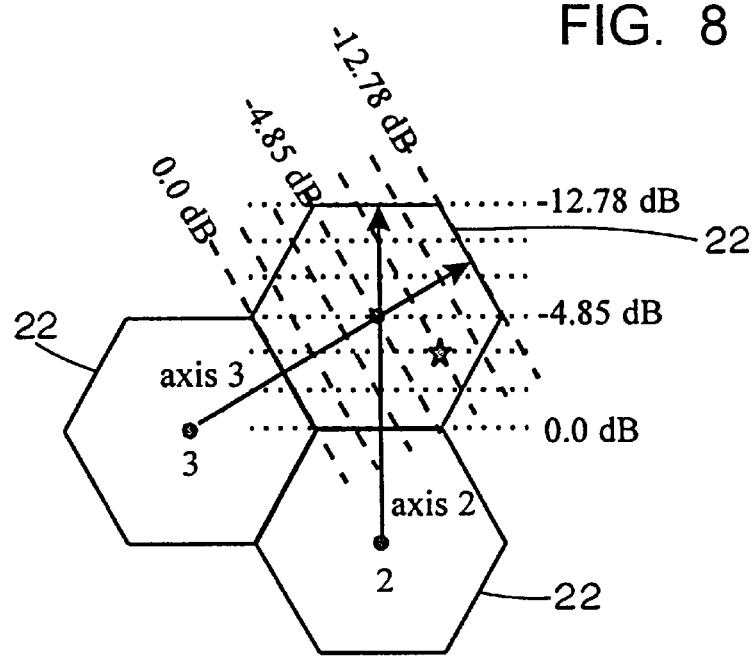
FIG. 8 is a schematic depiction of three neighboring spot beams, depicting a search procedure, by which lines of equal relative power are used to estimate terminal location using the first method of determining the user terminal position estimate based on relative power measurements.

The 3-D position acquisition problem is now reduced to a 2-D problem with two unknowns y''' and z'''. On this new plane, the terminal 18 can now search for its location efficiently with the least amount of computations. The terminal 18 will first search on this plane, as shown in FIG. 8, along the axis$_2$, joining spot beam$_1$ and spot beam$_2$, for a point $(y_{u2}, z_{u2})$ with relative power equal to the relative power measured between spot beam$_1$ and spot beam$_2$ during the spot beam selection or reselection algorithm. At this point $(y_{u2}, z_{u2})$, a line perpendicular to axis$_2$ will be drawn. The terminal 18 will then repeat the same process between spot beam$_1$ and spot beam$_3$. The terminal 18 will search along axis$_3$, joining spot beam$_1$ and spot beam$_3$, for a point $(y_{u3}, z_{u3})$ with relative power equal to the relative power measured between spot beam$_1$ and spot beam$_3$ during the spot beam selection procedure. Again, at this second point $(y_{u3}, z_{u3})$, a line perpendicular to axis$_3$ will be drawn. The intersection of these two lines will give an estimate of the position of the terminal 18.

The following algorithm should be used to estimate the position of the terminal 18 once the four steps required to map the three spot beams 22 on this 2-D plane have been completed. As a convention in this algorithm:

The selected spot beam 22 is referred as spot beam$_1$.

The coordinates of the center of spot beam$_i$ (i=2,3) are denoted $y_i'''$ and $z_i'''$.

The relative power measured between spot beam$_1$ and spot beam$_i$ (i=2,3) through the spot beam selection procedure is referred as max$_{i[]}$_power_level.

The relative power calculated between spot beam$_1$ and spot beam$_i$ (i=2,3) through the position determination algorithm is referred as diff_power$_i$.

The coordinates of the point along $axis_2$ with relative power (diff_power$_2$) equivalent to the measured relative power (max$_2$_power_level) are denoted $y_{u2}$ and $z_{u2}$. Similarly, the coordinates of the point along $axis_3$ with relative power (diff_power$_3$) equivalent to the measured relative power (max$_3$_power_level) are denoted $y_{u3}$ and $z_{u3}$.

The minimum power level, used to first guess the location of the terminal 18 within the selected spot beam, can vary depending on the satellite inclined orbit. Beam center positions do not change on the ground. The satellite beamwidth is modified to keep the beam center positions fixed on the ground. Consequently, the angle between the center of a beam and the edge of the same beam is not fixed but depends on the satellite position. To calculate the minimum_power_level$_2$ and minimum_power_level$_3$, we first need to calculate the angle between beam$_1$ and beam$_2$ and beam$_1$ and beam$_3$ respectively. Once we get these angles, we can calculate, via the antenna pattern approximation equation, the powers at these angles.

The algorithm shall be performed twice for i=2, and i=3.

---

Figure 9:
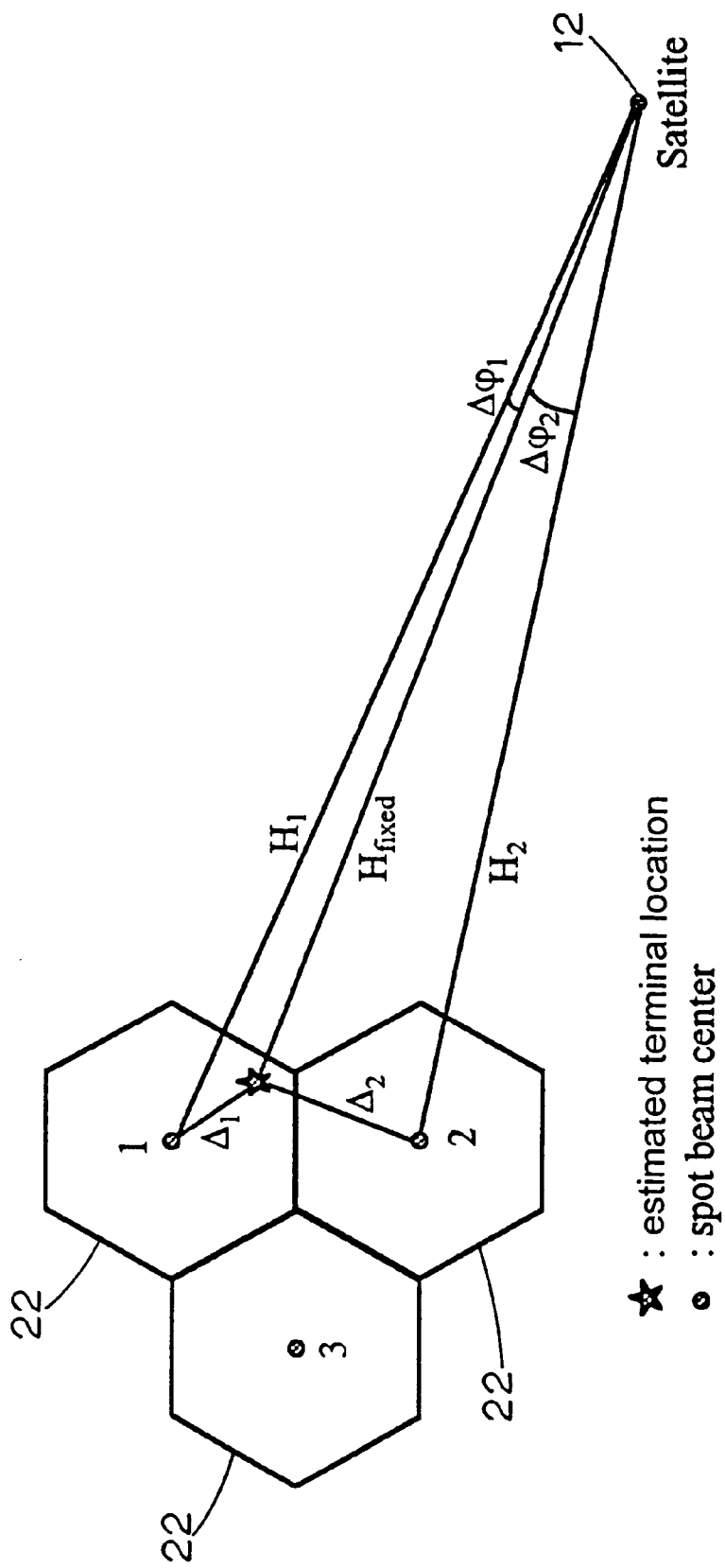
FIG. 9 is a schematic depiction of three neighboring spot beams, showing distances and angles used for the first method of determining the user terminal position estimate based on relative power measurements.

1) Initialize the different variables:
   increment = 0.0;
   increment$_1$ = 0.0;
   minimum_power_level$_2$, minimum_power_level$_3$;
      /* Use to first guess terminal location within selected spot beam. See FIG. 8*/
   maximum_power_level = 0.0 dB;
   diff_power$_2$ = diff_power$_3$ = 100.0;     /* Temporary value */
   if (minimum_power_level$_i$ < max$_i$_power_level < maximum_power_level)
         $y_{ui}''' = y_i'''/2; z_{ui}''' = z_i'''/2;$
      else
         $y_{ui}''' = -y_i'''/2; z_{ui}''' = -z_i'''/2;$
2) Perform position determination
   while (max$_i$_power_level != diff_power$_i$)
   {
      $y_{ui}''' = y_{ui}''' + y_i'''*increment_1;$
      $z_{ui}''' = z_{ui}''' + z_i'''*increment_1;$ $$H_{fixed} = \sqrt{x_{sat}'''^2 + (y_{sat}''' - y_{ui}''')^2 + (z_{sat}''' - z_{ui}''')^2} ;$$

$$H_1 = \sqrt{x_{sat}'''^2 + y_{sat}'''^2 + z_{sat}'''^2} ;$$

$$\Delta_1 = \sqrt{y_{ui}'''^2 + z_{ui}'''^2} ;$$

$$\Delta\varphi_1 = \operatorname{acos}\left(\frac{H_1^2 + H_{fixed}^2 - \Delta_1^2}{2*H_1*H_{fixed}}\right);$$

$$H_i = \sqrt{x_{sat}'''^2 + (y_{sat}''' - y_i''')^2 + (z_{sat}''' - z_i''')^2} ;$$

$$\Delta_i = \sqrt{(y_i''' - y_{ui}''')^2 + (z_i''' - z_{ui}''')^2} ;$$

$$\Delta\varphi_i = \operatorname{acos}\left(\frac{H_i^2 + H_{fixed}^2 - \Delta_i^2}{2*H_i*H_{fixed}}\right);$$

$$\Delta D_1 = 10*\log\left[\left(\frac{\sin\left(\frac{2\pi*ap}{\lambda}\sin(\Delta\varphi_1)\right)}{\frac{2\pi*ap}{\lambda}\sin(\Delta\varphi_1)}\right)^2\right]; \quad \text{/* ap is the aperture = 4.5 m */}$$

$$\Delta D_i = 10*\log\left[\left(\frac{\sin\left(\frac{2\pi*ap}{\lambda}\sin(\Delta\varphi_i)\right)}{\frac{2\pi*ap}{\lambda}\sin(\Delta\varphi_i)}\right)^2\right]; \quad \text{/* Power in dB */}$$

diff_power$_i$ = $\Delta D_1 - \Delta D_i$;   /* Calculated relative power in dB */
if (diff_power$_i$ > max$_i$_power_level)

$$\text{increment}_1 = \frac{-1}{4*\text{increment}};$$

else $$\text{increment}_1 = \frac{1}{4*\text{increment}};$$

increment = 2*increment;
} if $((y_{u2}''' == 0.0) \&\& (y_{u3}''' == 0.0))$
{
   $y_{new}''' = 0.0;$ $$z_{new}''' = \frac{(z_{u2}''' + z_{u3}''')}{2.0};$$
}
else if $((y_{u2}''' == y_{u3}''') \&\& (z_{u2}''' == z_{u3}'''))$
{
   $$y_{new}''' = \frac{(y_{u2}''' + y_{u3}''')}{2.0};$$

$$z_{new}''' = \frac{(z_{u2}''' + z_{u3}''')}{2.0};$$
}
else
{
   $y_{new}''' = (z_2''' * y_3''' * y_{u3}''' + z_{u3}''' * z_2''' * z_3''' - y_2''' * z_3''' * y_{u2}''' - z_{u2}''' * z_2''' * z_3''')/$
   $(z_2''' * y_3''' - y_2''' * z_3''');$ $z_{new}''' = ((y_2'''/z_2''') * (y_{u2}''' - y_{new}''')) + z_{u2}''';$
}

Where ap=4.5 m is the aperture of the satellite, $\lambda\approx0.2$ m is the wavelength, and $H_1$, $H_i$, $H_{fixed}$, $\Delta_1$, $\Delta_i$, $\Delta\phi_1$, and $\Delta\phi_i$ are graphically represented in FIG. 9.

Once the position of the terminal 18 has been determined on the 2-D plane 100, the coordinates of this location need to be mapped back on the surface of the Earth 21. The following algorithm describes the three steps required to map back the coordinates of the estimated position of the terminal 18 on the surface of the Earth 21.

1) Translate the coordinates such that the selected spot beam, spot beam$_1$, which was located at the center of the 2-D plane 100, is returned to its original location on the 2-D plane 100:

$x_{new}'' = x_1'' + R;$
   $y_{new}'' = y_{new}''' + y_1'';$ $z_{new}'' = z_{new}''' + z_1''$;

2) Map the coordinates from the 2-D plane 100 back to the surface of the earth 21:

$$x'_{new} = \frac{-B \pm \sqrt{B^2 - 4*A*C}}{2*A} \text{ where}$$

$$A = 1 + \left(\frac{y''_{new}}{H}\right)^2 * \left(1 + \left(\frac{z''_{new}}{y''_{new}}\right)^2\right);$$

$$B = -2*(R+H)*\left(\frac{y''_{new}}{H}\right)^2 * \left(1 + \left(\frac{z''_{new}}{y''_{new}}\right)^2\right);$$

$$C = (R+H)^2 * \left(\frac{y''_{new}}{H}\right)^2 * \left(1 + \left(\frac{z''_{new}}{y''_{new}}\right)^2\right) - R^2;$$

$$y'_{new} = (R + H - x'_{new}) * \left(\frac{y''_{new}}{H}\right);$$

$$z'_{new} = \left(\frac{z''_{new}}{y''_{new}}\right) * y'_{new};$$

with R=6378 km and H=35787 km.

3) Rotate the coordinates by $\theta_{sat}$ and $\psi_{sat}$ such that the GEM satellite 12 is returned to its original location:

$x_{new} = ((x_{new}' \cos(\psi_{sat}) - z_{new}' \sin(\psi_{sat}))\cos(\theta_{sat})) - y_{new}' \sin(\theta_{sat})$;

$y_{new} = y_{new}' \cos(\theta_{sat}) + ((x_{new}' \cos(\psi_{sat}) - z_{new}' \sin(\psi_{sat})) \sin(\theta_{sat}))$;

$z_{new} = z_{new}' \cos(\psi_{sat}) + x_{new}' \sin(\psi_{sat})$;

Where $\theta_{sat} = a \tan(y_{sat}/x_{sat})$ and $\psi_{sat} = a \tan(z_{sat}/\sqrt{x_{sat}^2 + y_{sat}^2})$.

The coordinates of the estimated position of the terminal 18 are $x_{new}$, $y_{new}$ and $z_{new}$ for this combination. These steps are repeated for one to twelve combinations of three spot beams depending on the number of neighbors in the cluster. The final estimated position of the terminal 18 is the averaged of all the estimated positions ($x_{new}$, $y_{new}$, $z_{new}$) from each combination of three spot beams.

POSITION ESTIMATE METHOD #2

Figure 10:
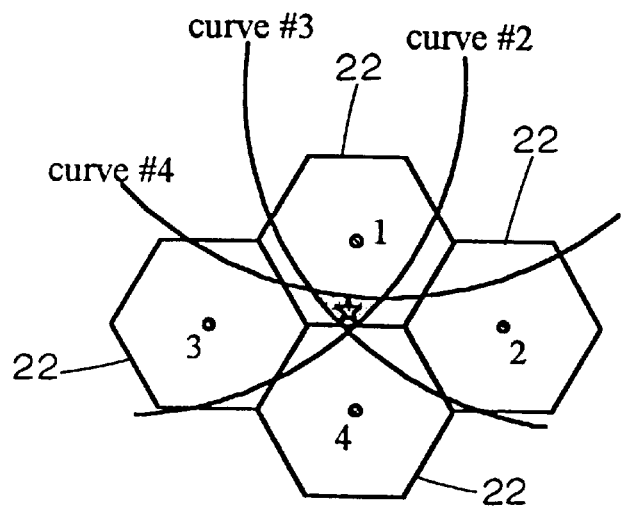
FIG. 10 is a schematic depiction of a second method for estimating the user terminal position based on relative power measurements by finding a set of points of constant relative power equal to the relative power measured from three strongest neighboring spot beams.

The user terminal 18 calculates a set of points of constant relative power equal to the relative power measured from the three strongest spot beams excluding the selected spot beam. These 3 sets of points form 3 curves with intersecting points, as shown in FIG. 10. If there is no error introduced, only one point would intersect the three curves at the same time and solve the user terminal position search. However, some error is introduced such as beam pointing error, orbit inclination deviation, fading and slot-to-slot gain fluctuations. The 3 closest intersection points between $curve_2$ & $curve_3$, $curve_2$ & $curve_4$, and $curve_3$ & $curve_4$ form a confidence region 104 around the exact user terminal location.

Figure 11:
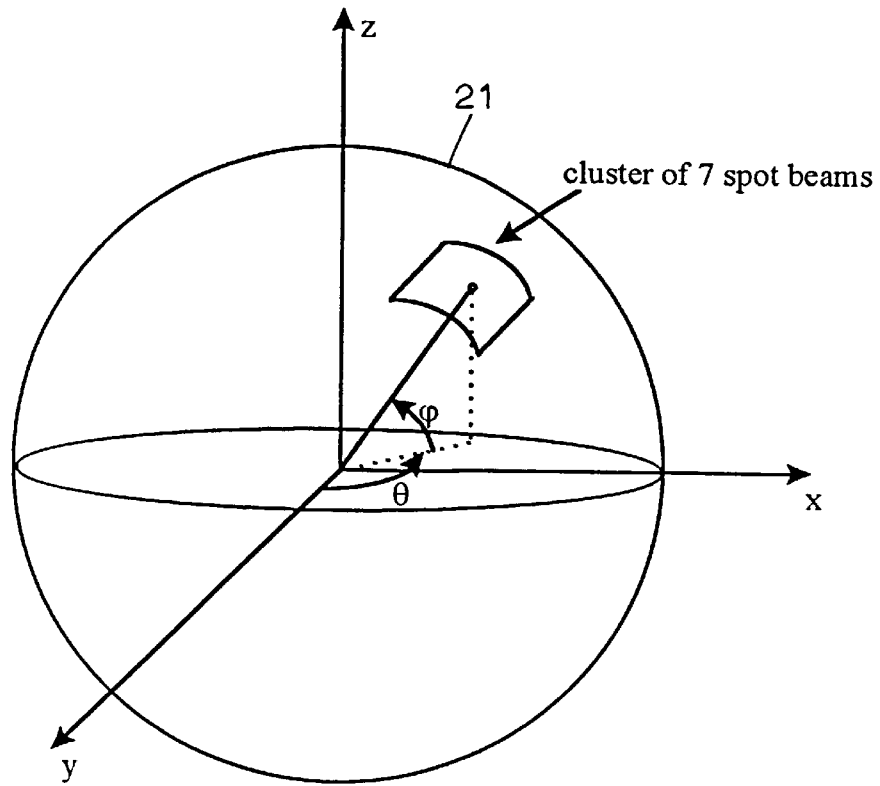
FIG. 11 is a schematic depiction of two rotational steps of a coordinate transformation for defining a cluster of spot beams on a 2-D plane, centered around a selected spot beam.

To ease the position acquisition problem, the three strongest spot beams, located on the surface of the Earth 21, will be rotated and translated in space to end on a 2-D plane with two unknowns y and z instead of the three starting unknowns x, y, z. These transformations will not modify the shape of the spot beams. Consequently, the spot beams will not all have the same dimension on this 2-D plane. The cluster of spot beams will undergo three stages of transformation to end on a 2-D plane centered around the selected spot beam:

1) The spot beams and the satellite coordinates will first be rotated by $\theta$ (see FIG. 11) such that the center of the selected spot beam is aligned with the x axis:

$x' = x*\cos\theta + y*\sin\theta$;

$y' = y*\cos\theta - x*\sin\theta$;

$z' = z$;

2) The spot beams and the satellite coordinates are then rotated such that the center of the selected spot beam is traversed by the x axis.

$x'' = x'*\cos\phi + z'*\sin\phi$;

$y'' = y'$;

$z'' = z'*\cos\phi - x'*\sin\phi$

3) The spot beams and the satellite coordinates are then translated by ($x_1$, $y_1$, $z_1$) such that the selected spot beam center location ($x_1$, $y_1$, $z_1$) becomes (0, 0, 0).

$x''' = x'' - x_1''$;

$y''' = y'' - y_1''$;

$z''' = z'' - z_1''$.

Figure 12:
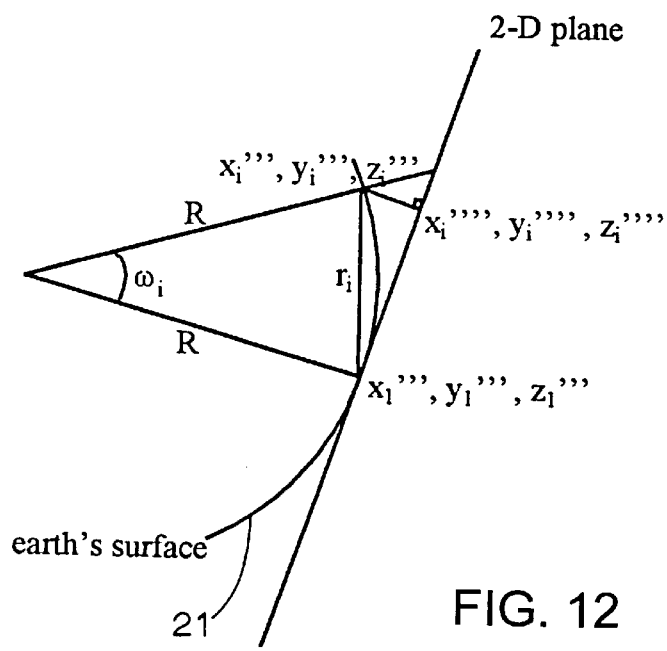
FIG. 12 is a schematic depiction of a coordinate transformation for uncurving a cluster of spot beams, lying on the surface of the earth, to lie a 2-D plane.

4) Finally, the cluster lying on the surface of the earth is uncurved to lie on a 2-D plane. This transformation will remove the x component of the coordinates of the center of spot beam$_i$ (i=2,3,4). In order to keep the original dimensions of the system as much as possible such that the distance between the satellite and the center of spot beam$_i$ remains constant, I will move the satellite with each spot beam. The y and z coordinates of the spot beams and the satellite are not affected by these transformations.

$$r_i = \sqrt{(x_i''' - x_1''')^2 + (y_i''' - y_1''')^2 + (z_i''' - z_1''')^2};$$

$$\omega_i = a\cos\left(1 - 0.5*\left(\frac{r_i}{R}\right)^2\right);$$

$$x_i''' = x_i''' + R*(1 - \cos\omega_i);$$

$$x_{sat_i}''' = x_{sat}''' + R*(1 - \cos\omega_i);$$

where R=6378 km and $r_i$ and $\phi_i$ are as depicted in FIG. 12.

By performing these transformations, the position search problem was reduced from a 3-D problem to a 2-D problem with y, and z as unknowns. Once these transformation are completed, the user terminal 18 shall first identify the limits of the region where it shall search for its location to further reduce the amount of computations. The user terminal 18 can then start scanning this region. For each y, and z possible combination within that region, the user terminal 18 calculates the relative power from the three strongest spot beams excluding the selected spot beam. If at a certain location y and z, each relative power matches each corresponding relative power measured by the user terminal, a position estimate is found. The relative power between spot beam$_1$ and spot beam$_2$, spot beam$_3$, and spot beam$_4$ is calculated for a certain user terminal position ($y_u$, $z_u$) as follows:

$$H_{fixed} = \sqrt{x_{sat_u}'''^2 + (y_{sat_u}''' - y_u''')^2 + (z_{sat_u}''' - z_u''')^2};$$

$$H_i = \sqrt{x_{sat_i}'''^2 + (y_{sat_i}''' - y_i''')^2 + (z_{sat_i}''' - z_i''')^2}; \quad /* \text{ For } i = 1, 2, 3, 4 */$$

$$\Delta_i = \sqrt{(y_i''' - y_u''')^2 + (z_i''' - z_u''')^2};$$

$$\Delta\varphi_i = a\cos\left(\frac{H_i^2 + H_{fixed}^2 - \Delta_i^2}{2*H_i*H_{fixed}}\right);$$

-continued $$\Delta D_i = \left( \frac{\sin\left(\frac{2\pi * ap}{\lambda} \sin(\Delta\varphi_i)\right)}{\frac{2\pi * ap}{\lambda} \sin(\Delta\varphi_i)} \right)^2 \; ; \quad /* \; ap = \text{aperture} = 4.5\text{m},$$

$\lambda$ = wavelength  Power in Watts */ diff_power$_i$ = $\Delta D_i / \Delta D_1$;  /* for $i$ = 2, 3, 4. Relative power in Watts */ where $H_1$, $H_i$, $H_{fixed}$, $\Delta_1$, $\Delta_i$, $\Delta\phi_1$ and $\Delta\phi_i$ are graphically represented in FIG. 9.

If the diff_power$_i$ is equal to the relative power measured between spot beam$_1$ and spot beam$_2$, this point is kept and will be one of the point forming curve$_i$. Once the whole region has been scanned, three curves are obtained. The intersection of these three curves will estimate the user terminal position as shown in FIG. 10.

The signal power measurements are reported by terminals 18 after obtaining a GPS fix, and the signals are in turn calibrated by the network 10. Thus the signals are kept equalized, and enhanced accuracy is achieved in the power-measurement based position estimations. If better accuracy is still required, the terminal 18 may incorporate knowledge of last known position, the time elapsed since that position fix, the predicted likelihood of movement since its last position fix, and the statistical expectation of location of the terminal 18 into its position estimate.

In the event that GPS positioning is unavailable (due to obscuration, etc.) this position estimate based upon signal strengths is used in lieu of a GPS position fix.

The position estimate is converted to Latitude/Longitude coordinates by the terminal 18 and inserted into the terminal GPS receiver 19.

Providing Additional Initialization Information:

General Case

A typical GPS receiver calculates its position based on knowledge of four GPS satellite positions, and its distance from each satellite. Four GPS satellites are required due to the need to determine four unknowns from four equations: position in each of three dimensions, and exact time.

The availability of an extremely accurate time reference (i.e., accurate to within about two microseconds) would reduce the number unknowns in the equations, and reduce the required number of GPS satellite acquisitions required for a position fix, from four to three, provided some degradation of fix accuracy is tolerable.

Additional positioning information, beyond a rough estimate, may further reduce the number of required GPS signal acquisitions. The communications network 10 may contain a database of altitude information. Based upon the rough position estimate, an altitude lookup table, and the history of the terminal, an altitude estimate may be formed which would substitute for one of the equations. Also, the network may be able to determine a distance between the terminal 18 and a known reference, such as a satellite or a ground-based antenna. Such information may further reduce the number of satellite acquisitions necessary to compute a position.

Re-broadcasting a current GPS almanac at a high data rate (block 39 of FIG. 4) would also enhance GPS acquisition performance of the terminals 18.

GEM System

The network 10 predicts the altitude of a terminal 18 based on the geography of its spot beam 22, its rough position estimate within that spot beam 22, population distribution within that spot beam 22, and the location history of the terminal 18. An altitude estimate reduces the number of GPS satellites 14 required for a position fix from four to three.

Also, the network 10 may determine precise GPS time, and the distance from a terminal 18 to the GEM satellite 12, which has a known position. This is done in the following manner: after the terminal 18 determines its spot beam 22, it assumes it is located in the center of the spot beam 22, and performs time synchronization by adding an offset to the received GEM satellite signal time stamp, based on the distance from the GPS satellite 14 to the center of the terminal's spot beam 22. The gateway 16 monitors transmissions in both directions and calculates a correction for the terminal's local time, with relation to the real GEM satellite time. The gateway 16 then sends a time-correction offset to the terminal 18. Based on the time-correction offset, the terminal 18 achieves highly accurate (around 2 $\mu$S) synchronization to GPS time. Also based on the offset, the terminal 18 may then compute its exact distance from the GEM satellite 12.

With this invention, time and altitude can be estimated with enough accuracy to be treated as known parameters, solving two of four positioning equations. Acquisition of 2 GPS satellites 14 should suffice in situations where some degradation of fix accuracy is tolerable. But if the GEM position and distance from the terminal GPS receiver 19 are known to high enough accuracy, one GPS satellite 14 could be replaced in the calculations by the GEM satellite 12, and GPS position could potentially be done with 1 GPS satellite acquisition.

As an additional feature, the GEM network 10 supports GPS almanac re-broadcast. The GPS almanac, as described in Navstar's ICD-GPS-200, gives approximate orbital descriptions of all GPS satellites 14. If stored by a GPS receiver, it will be able to achieve optimal performance in conjunction with this invention. If a terminal's GPS receiver has a GPS almanac within a few weeks of age, it may begin a directed satellite signal search even before it receives all of the GEM broadcast data, whereas without an almanac, it would wait for the conclusion of the GEM broadcast before beginning a directed search. Thus, the GEM system re-broadcasts the GPS almanac (obtained through the GPS receiver 20, located at the gateway 16) in a background channel, so that a terminal 18 may update its almanac whenever needed.

the present invention has been described with reference to specific example, which are intended to be illustrated only, and to be limiting of the invention, as it will be apparent to those of ordinary skills in the art that changes, additions and/or deletions may be made to the disclosed embodiments without departing from the spirit and scope of the invention.

What is claimed is:

1. A method of initializing a GPS receiver to rapidly acquire GPS satellite signals for establishing a precise estimate of the position of the GPS receiver, the method comprising the steps of:

broadcasting a signal representative of orbital trajectories of one or more GPS satellites within view of the GPS receiver;

broadcasting a time synchronization signal;

calculating a rough estimate of the position of the GPS receiver; and inserting the signal representative of orbital trajectories, the time synchronization signal, and the rough estimate of the position of the GPS receiver into the GPS receiver.

2. The method of claim 1, wherein the time synchronization signal is accurate to within about five milliseconds.

3. The method of claim 1, wherein the rough estimate of the position of the GPS receiver is accurate to within about 1,000 kilometers.

4. The method of claim 1, wherein the orbital trajectories signal is broadcast via a satellite.

5. The method of claim 1, wherein the orbital trajectories signal is broadcast via an idle communication channel.

6. The method of claim 1, wherein the time synchronization signal is broadcast via an idle communication channel.

7. The method of claim 2, wherein the time synchronization signal is broadcast via a satellite.

8. A communication network comprising:

at least one communication station;

a plurality of GPS satellites; and a terminal;

the communication station including means for sending communication signals, GPS satellite trajectory signals, and time synchronization signals to the terminal;

the terminal including:

means for receiving communication signals from the communication station;

means for sending communication signals to the communication station;

means for receiving GPS signals from the GPS satellites; and means for processing the GPS satellite trajectory signals and time synchronization signals to rapidly determine the position of the terminal.

9. The communication network of claim 8, wherein at least one of the communication stations is a satellite in Earth orbit.

10. The communication network of claim 8, further including a gateway station including gateway receiving means for receiving GPS signals from the GPS satellites and gateway transmitting means for sending GPS data to the communication station.

11. The communication network of claim 10, wherein the gateway station is fixed to the Earth.

12. A method of initializing a remote GPS receiver to rapidly acquire GPS satellite signals for establishing a precise estimate of the position of the remote GPS receiver, the method comprising the steps of:

providing an active GPS receiver at a fixed location which computes precise GPS satellite trajectories;

broadcasting a signal representative of the precise GPS satellite trajectories of one or more GPS satellites within view of the remote GPS receiver;

broadcasting a time synchronization signal;

calculating a rough estimate of the position of the remote GPS receiver; and inserting the signal representative of orbital trajectories, the time synchronization signal, and the rough estimate of the position of the remote GPS receiver into the remote GPS receiver.

13. The method of claim 12, further including a step of re-broadcasting a current GPS almanac over a high-speed channel.

14. The method of claim 12, further including a step of broadcasting a remote GPS receiver altitude estimate.

15. The method of claim 12, further including the steps of:

measuring propagation delay between a known reference and the remote GPS receiver; and providing the remote GPS receiver with an extremely accurate time signal and a position reference calculated from the measured propagation delay.

16. A terminal for use in a communication network, the communication network comprising at least one communication station and a plurality of GPS satellites, the communication station including means for sending communication signals, GPS satellite trajectory signals, and time synchronization signals to the terminal, the terminal comprising:

means for receiving communication signals from the communication station;

means for sending communication signals to the communication station;

means for receiving GPS signals from the GPS satellites; and means for processing the GPS satellite trajectory signals and time synchronization signals to rapidly determine the position of the terminal.

17. A gateway station for use in a communication network, the communication network comprising at least one terminal, a communications satellite and a plurality of GPS satellites, the gateway station comprising:

a continually-tracking GPS receiver;

means for computing GPS satellite trajectory data for GPS satellites visible to each terminal;

means for computing a rough position estimate for each terminal; and means for sending signals representing GPS satellite trajectory data, time synchronization signals, and signals representing rough position estimates to each terminal.

* * * * *